Patented Feb. 18, 1941

2,231,905

UNITED STATES PATENT OFFICE 2,231,905

ALIPHATIC VINYL TERTIARY AMIDES

William Edward Hanford and Halsey Bidwell Stevenson, Wilmington, Del., assignors to E. I. du Pont de Nemours & Company, Wilmington, Del., a corporation of Delaware No Drawing. Application March 3, 1939, Serial No. 259,684

16 Claims. (Cl. 260—84)

This invention relates to unsaturated organic nitrogen compounds and more particularly to amides.

This invention has as an object the provision of a new and useful pyrolysis process. A further object is the preparation of new monomeric amides. Another object is the preparation of polymers and interpolymers of these amides. A still further object is the preparation of plastic and coating compositions. Other objects will appear hereinafter.

These objects are accomplished by the following invention wherein an N-(β-acyloxyethyl) tertiary amide of an aliphatic carboxylic acid is pyrolysed preferably at 300–650° C. to an N-vinyl tertiary amide of an aliphatic carboxylic acid. This N-vinyl tertiary amide may then be polymerized to new and useful polymers and interpolymers. A tertiary amide is an amide all of whose valences are attached to carbon including not only those in which only one valence is attached to carbonyl but also those wherein two valences are so attached, i. e., imides of aliphatic dicarboxylic acids.

The raw materials for the initial phase of the present invention are the N-(β-acyloxyethyl) tertiary amides of aliphatic carboxylic acids.

These tertiary amides may be prepared in various ways, e. g., (a) β-aminoethanol is reacted with a dicarboxylic acid or its anhydride, acid halide, or esters to form the beta-hydroxyethylimide which is then acylated to the N-(beta-acyloxyethyl) tertiary imide; (b) an N-(beta-hydroxyethyl) secondary amine is acylated to the tertiary hydroxyamide with an aliphatic acylating agent and with the same or a different acylating agent acylated to the acyloxy tertiary amide.

While N-β-acyloxyethyl secondary amides, e. g., N-β-acetoxyethylacetamide on pyrolysis at 500° C. give oxazolines, e. g., methyloxazoline, the N-β-acyloxyethyl tertiary amides including imides, however made, are pyrolyzed, preferably at 300–650° C., to form monomeric N-vinyl tertiary amides of the aliphatic carboxylic acids. Any N-β-acyloxyethyl tertiary amide of an aliphatic carboxylic acid including tertiary imides of aliphatic dicarboxylic acids may be employed.

The N-vinyl tertiary amides of the aliphatic carboxylic acids are polymerized in most instances at temperatures from 25° to +150° C. in the presence or absence of catalysts, and preferably at a temperature between 60 and 100° C. in the presence of a polymerization catalyst in an open or closed system. In a closed system, the polymerization may be carried out at subatmospheric or superatmospheric pressure.

The monomer may be polymerized alone or in admixture with other unpolymerizable materials, e. g., solvents, or in admixture with other polymerizable materials.

The more detailed practice of the invention is illustrated by the following examples, wherein parts given are by weight and the temperatures are in centigrade degrees. There are of course many forms of the invention other than these specific embodiments.

Example I

N-(beta-acetoxyethyl) succinimide is pyrolyzed by passing this compound through a 2" glass tube packed with glass rings and maintained at 540–550°. The pyrolysate is distilled at reduced pressure through an efficient fractionating column to give crude N-vinylsuccinimide, B. P. 96°/3 mm. The N-vinylsuccinimide is recrystallized from a mixture of ligroin and benzene and melts at 47.5–48° C. A sample prepared by this method analysed for carbon 57.76%, for hydrogen 5.81%, and for nitrogen 11.01%, the theoretical values being 57.60%, 5.60% and 11.20%, respectively.

To obtain a polymer in granular form, 20 parts of N-vinylsuccinimide is added to a solution of 0.06 part of methylstarch in 50 parts of water and the mixture is stirred vigorously at 80–85° after adding 0.2 part of benzoyl peroxide. Polymerization is rapid and is complete in about ten minutes. The sticky, translucent, granular material is washed several times by decantation, and is dried with stirring to prevent agglomeration. The yield of poly-N-vinylsuccinimide is quantitative. A chip molded from this granular polymer at 240° is light brown, transparent and tough, with a hardness of about 2.5 on the Moh's scale and a softening point of 210°. The poly-N-vinylsuccinimide is swelled by water, acetone, and alcohols. It is soluble in phenols, dimethylformamide, dilute mineral acids, and organic aliphatic acids. It is not soluble in hydrocarbon solvents, or in ethers or esters.

Example II

N-(beta-acetoxyethyl) diglycolylimide is pyrolyzed at 590–600° by the same method as described in Example I. The pyrolysate is distilled under reduced pressure to give crude N-vinyldiglycolylimide. After decrystallization once from a ligroin-benzene mixture and once from dibutyl ether, the N-vinyldiglycolylimide is obtained as fine white needles, M. P. 46.5–48°. A sample prepared by this method analysed for carbon 50.47%, for hydrogen 5.12%, and for nitrogen 9.91%, the theoretical values being 51.1%, 4.96% and 9.93%, respectively.

The N-vinyldiglycolylimide is readily polymerized by heating the monomer with 1% of benzoyl peroxide at 90° C. for 10 minutes. The poly-N-vinyldiglycolylimide can be spun to fibers which are swelled by water and which soften at about 100°.

Example III

N-(beta-acetoxyethyl)-N-methylacetamide is pyrolyzed at 465–475° by the method of Example I and the pyrolysate is fractionated under reduced pressure to give crude N-vinyl-N-methylacetamide, boiling at 69–85°/28 mm. Since the N-vinyl-N-methylacetamide forms an azeotropic mixture containing about 25% of acetic acid, the crude distillate is treated with saturated potassium carbonate solution until alkaline and is then extracted with benzene and redistilled. Pure N-methyl-N-vinylacetamide boils at 70°/25 mm. A sample prepared by this method contained 14.25% nitrogen as compared with a theoretical value of 14.14%, and had an index of refraction $n_D^{25}$ of 1.4786 and a density $d_4^{25}$ of .9591.

The N-vinyl-N-methylacetamide is polymerized with the aid of iodine to a viscous brown liquid. Boron trifluoride etherate likewise causes rapid polymerization to a viscous brown liquid at room temperature and to a nearly colorless solid material at low temperatures, e. g. —50° C. By heating equal portions of N-vinyl-N-methylacetamide and methyl methacrylate with 2% of benzoyl peroxide for 5 minutes at 110° there is obtained an interpolymer, soluble in alcohol but not soluble in toluene, containing 24% by weight of the N-vinyl-N-methylacetamide. An unmodified methyl methacrylate polymer is insoluble in alcohol and soluble in toluene.

Example IV

N-(beta-acetoxyethyl)-N-phenylacetamide is pyrolyzed at 480–490° by the method of Example I and the pyrolysate is distilled under reduced pressure. The fraction boiling from 96 to 101° at 3 mm. is a solid which is recrystallized twice from ligroin to give colorless crystals, M. P. 51–52° which are soluble in acetone and alcohol but insoluble in water. A sample prepared in this manner contained 8.94% nitrogen as compared with a theoretical value of 8.69%.

The N-vinyl-N-phenylacetamide is polymerized by heating, at 100° C. for 5 minutes, with a trace of iodine, to a black viscous liquid. When equal quantities of N-vinyl-N-phenylacetamide and methyl methacrylate are heated at 100° C. for 5 hours with 1% of benzoyl peroxide there is obtained a nitrogen-containing interpolymer which is soluble in both alcohol and benzene.

Example V

In a reaction vessel equipped with an efficient leak-proof agitating means, a reflux condenser and a heated means for adding liquids is placed 200 parts of a 0.5% aqueous solution of sodium-starchglycolate dispersing agent, together with 33.3 parts of vinyl acetate and 0.25 part of benzoyl peroxide. A quantity of N-vinylsuccinimide equal to 16.6 parts is placed in the addition equipment and heated to slightly above its melting point. The reactor and contents are then heated to 65° and the molten N-vinylsuccinimide added slowly with vigorous stirring during approximately forty-five minutes. The temperature of the reaction mixture rises slowly during the addition of the N-vinylsuccinimide and, shortly after the addition is completed, rises to 75°. Stirring and heating at 70–75° are continued for an additional ten minutes. After cooling, the solid is filtered from the reaction mixture, washed thoroughly with distilled water, and air dried overnight in a stream of air. A clear molding made from this interpolymer is light-colored and tough, and softens between 70 and 75°.

Example VI

To a solution of 0.6 part of methylstarch in 200 parts of water is added 75 parts of methyl methacrylate and 25 parts of N-vinylsuccinimide. To the rapidly stirred mixture heated to 80° is added 1 part of benzoyl peroxide. After stirring at 80° C. for ten minutes the granular interpolymer is washed and dried to give a material which when molded gives a clear, hard, brittle chip, with a softening point of 130°.

Example VII

To a mixture of 30 parts of methyl acrylate, 20 parts of N-vinylsuccinimide, 0.25 part of benzoyl peroxide, and 2 parts of urea in 75 parts of methanol is added sufficient water to give a faint permanent cloudiness. The mixture is heated in a pressure vessel at 65° for three days. The spongy product obtained by this treatment is washed with water and dried at 70° to give 38 parts of interpolymer. A portion molded at 130° gives a clear, tough chip softening at 55°.

Example VIII

A solution of 10 parts of N-vinylsuccinimide, 40 parts of methacrylic acid, and 0.5 part of benzoyl peroxide in 150 parts of toluene is heated at 65° for one day in a closed reaction vessel. After removing the toluene there is obtained 50 parts of a fine, white, powdery interpolymer.

Example IX

An emulsion prepared from 10 parts of N-vinylsuccinimide, 24 parts of dichloroethylene, 6 parts of vinyl acetate, 0.4 part of 30% hydrogen peroxide, 2.4 parts of sulfated oleyl acetate, 0.8 part of concentrated hydrochloric acid and 60 parts of water is heated at 45° for five days in a closed reaction vessel. There is obtained 27 parts of an interpolymer which can be molded at 130° to a dark chip softening at 77°.

Example X

An emulsion prepared from 15 parts of N-vinylsuccinimide, 25 parts of methacrylonitrile, 5 parts of sulfated oleyl acetate, 1 part of 30% hydrogen peroxide and 125 parts of water is allowed to stand in a closed vessel at 65° for three days. The resulting interpolymer can be molded at 150° to a fairly tough chip with a softening temperature of 78°.

Example XI

A mixture of 10 parts of N-vinyl-alpha-pentenyl-succinimide and 40 parts of methyl methacrylate is interpolymerized by the method of Example I using benzoyl peroxide as catalyst, to give 46 parts of a granular polymer with a softening temperature of 112°.

Example XII

A mixture of 72 parts of chloroprene, 8 parts of N-vinylsuccinimide, 0.8 part of benzoyl peroxide and 60 parts of carbon tetrachloride is heated on a bath maintained at 80° for eight hours. After washing with alcohol, there is obtained 73.6 parts of a rubbery interpolymer containing 11 parts of N-vinylsuccinimide. Analysis of the product prepared in this manner gave 35.13% chlorine.

Example XIII

A mixture of 15 parts of pure styrene, 5 parts of N-vinylsuccinimide and 0.1 part of benzoyl peroxide is heated for three days at 65° to give a light-yellow interpolymer softening at 90°.

This invention is not limited to the materials and conditions used in the above illustrative examples. The conditions used in the preparation of the monomeric N-vinyl tertiary amides can be varied over wide limits. The pyrolysis can be carried out by either a continuous or a batch process, but a continuous process is preferred. When a continuous process is used, the temperature is preferably between 300 and 650°. When a batch process is used the temperature is preferably between 300 and 500°. In Table I are given the names and formulas for the intermediates and the monomers prepared from them by pyrolysis as set forth in the preceding Examples.

Table I

| | Intermediates | Monomers |
|---|---|---|
| 1 | $\begin{array}{c}CH_2-C(=O)\\ \quad\quad\quad N-CH_2CH_2-O-C(=O)-CH_3\\ CH_2-C(=O)\end{array}$ <br> N-(beta-acetoxyethyl) succinimide | $\begin{array}{c}CH_2-C(=O)\\ \quad\quad\quad N-CH=CH_2\\ CH_2-C(=O)\end{array}$ <br> N-vinylsuccinimide |
| 2 | $\begin{array}{c}CH_2-C(=O)\\ O\quad\quad N-CH_2CH_2-O\\ CH_2-C(=O)\quad\quad C=O\\ \quad\quad\quad\quad\quad\quad CH_3\end{array}$ <br> N-(beta-acetoxyethyl) diglycolylimide | $\begin{array}{c}CH_2-C(=O)\\ O\quad\quad N-CH=CH_2\\ CH_2-C(=O)\end{array}$ <br> N-vinyldiglycolylimide |
| 3 | $CH_3C(=O)-N(CH_3)-CH_2CH_2-O-C(=O)-CH_3$ <br> N-(beta-acetoxyethyl) methylacetamide | $CH_3C(=O)-N(CH_3)-CH=CH_2$ <br> N-vinyl-N-methylacetamide |
| 4 | $CH_3C(=O)-N(C_6H_5)-CH_2CH_2-O-C(=O)-CH_3$ <br> N-(beta-acetoxyethyl)-N-phenyl acetamide | $CH_3C(=O)-N(C_6H_5)-CH=CH_2$ <br> N-vinyl-N-phenylacetamide |

Any β-acyloxyethyl tertiary amide of an aliphatic carboxylic acid may be employed including those wherein of the two valences of the amido nitrogen not satisfied by the acyloxyethyl group at least one is satisfied by an aliphatic acyl radical. This includes classes of compounds such as that wherein the two valences are satisfied by one aliphatic diacyl, i. e. divalent acyl radical such as the succinyl radical, that wherein the two valences are satisfied by two monovalent acyl radicals (which may be the same or different) and at least one of which is aliphatic, and that wherein one valence is satisfied by a monovalent aliphatic acyl radical and the other is satisfied by a monovalent hydrocarbon radical containing up to seven carbon atoms including alkyl, e. g., methyl, aralkyl, e. g., benzyl, aryl, e. g., phenyl, alicyclic, e. g., cyclohexyl.

The present invention is generic to the preparation, polymerization and interpolymerization of N-vinyl tertiary amides of aliphatic carboxylic acids having an unsubstituted methylene —CH₂— group including vinylimides of aliphatic dicarboxylic acids and preferably those containing six or less atoms in the imide ring, e. g., N-vinylglutarimide, N-vinyl-α-methylglutarimide and the corresponding β-methyl compound, N-vinylsuccinimide, N-vinyldiglycolylimide, N-vinylmethylsuccinimide, sym and asym N-vinyldimethylsuccinimide, N-vinyltetramethylsuccinimide, N-vinylphenylsuccinimide, N-vinylbutylsuccinimide, N-vinylthiodiglycolylimide S(CH₂—CO)₂NCH=₂, and all of the substituted N-vinylimides derived from the above where the substituent is on the alpha-vinyl carbon and is an alkyl, aryl, carboxyl, carbalkoxyl, carbonamido or cyano group. It is interesting to note that N-vinyl tertiary amides wherein a hydrogen on the terminal carbon, i. e. the beta carbon, is replaced, do not in general polymerize. This invention also includes N-vinyl aliphatic monocarboxylic acid tertiary amides, e. g., N-vinyl-N-ethylacetamide, N-vinyl-N-methylformamide, N-vinyl-N-tolylacetamide, N-vinyl-N-cyclohexylacetamide, N-vinyl-N-methylbutyramide, N-vinyl-N-butylacetamide, N-vinyl-N-methylpropionamide, N-vinyl-N-allylacetamide, N-vinyl-N-methylcapramide, and the alpha-substituted derivatives of the above tertiary N-vinylamides where the alpha-substituent on the carbon of the vinyl group attached to nitrogen is a member of the class consisting of alkyl, aryl, carboxyl, carbalkoxyl, carbonamido groups.

N-vinyl tertiary aliphatic amides polymerize in most instances at 25°–150° C. preferably in the presence of catalysts. For example, for the polymerization of tertiary vinyl amides from monocarboxylic acids iodine may be used as a catalyst at the higher temperatures and boron trifluoride etherate at lower temperatures. In the polymerization of the N-vinyl tertiary imides from aliphatic dicarboxylic acids, peroxides such as benzoyl peroxide, acetyl peroxide, hydrogen peroxide, etc. act catalytically to yield polymers.

The vinyl tertiary amides can be polymerized with any polymerizable compound having the formula

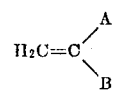

wherein A is hydrogen, halogen or a hydrocarbon radical and B is any negative radical including halogen and organic radicals containing a carbon atom joined to another atom by a plural bond, the carbon atom being removed from the vinylidene radical by not more than one atom. Exemplary compounds are vinyl esters, ethers, ketones, e. g., vinyl acetate, vinyl phenyl ether, methyl vinyl ketone; aryl vinyl compounds where the vinyl group is directly attached to nuclear carbon, e. g., styrene; alpha methylene aliphatic monocarboxylic acids, their esters, amides, and nitriles, e. g., acrylic acid, methacrylic acid, methyl acrylate, methyl methacrylate, methacrylamide, methacrylonitrile, and the like. Interpolymer formation may be catalyzed by peroxides such as benzoyl peroxide and hydrogen peroxide and may be carried out in an open or closed system and at atmospheric, sub-atmospheric or superatmospheric pressure.

The polymerizations and interpolymerizations of these N-vinyl tertiary aliphatic amides can be carried out by several different methods. The materials to be polymerized can be heated together with or without a catalyst, but when no catalyst is used the heating period usually is longer. The polymerization can be carried out in the presence of a nonreactive solvent in the presence or absence of catalysts. Suitable solvents include neutral (i. e., non-acidic and non-phenolic) hydroxylated compounds, ethers, hydrocarbons, and chlorinated hydrocarbons, such as methanol, butanol, diethylether, dibutyl ether, benzene, xylene, carbon tetrachloride, trichloroethylene, etc. The polymerizations may be carried out so as to yield a polymer in granular form, using water as the dispersing medium preferably and a suitable protective colloid such as soluble starch, methylstarch, an alkali salt of a methacrylic acid-methyl methacrylate interpolymer, partially neutralized polymethacrylic acid, polymethacrylamide, partially saponified polyvinyl acetate, etc. Polymerization may also be effected of the monomer in an emulsion using a suitable emulsifying agent such as alkali salts of alkyl naphthalenesulfonic acid, sodium salts of sulfated oleyl acetate, sodium oleate, triethanolamine stearate, cetylpyridinium bromide, sodium salts of sulfated coconut oil alcohols, sodium salts of long-chain sulfated vinyl-glycerides, sodium salts of sulfonates of long-chain amide derivatives, Turkey red oil, etc. and catalyst. Catalysts which may be used to bring about the above polymerizations include organic peroxides such as benzoyl peroxide and acetyl peroxide, and inorganic peroxides such as hydrogen peroxide. Other catalysts which may be used include boron trifluoride, aluminum chloride, stannic chloride, etc. The N-vinyl tertiary imides wherein the two amido nitrogen valences not satisfied by the vinyl group are completely satisfied by acyl radicals, i. e. are satisfied by one divalent aliphatic acyl radical, are preferably used in the interpolymerization since the interpolymerization is more readily carried out. The interpolymerization of the monocarboxylic acid N-vinyl tertiary amides at times requires drastic conditions. The divalent radical joining the two end acyl groups may be any divalent aliphatic including cycloaliphatic radical, but is preferably of a chain length such that the imide ring contains not more than six carbon atoms.

Monomeric N-vinyl tertiary amides of aliphatic carboxylic acids contain a reactive ethylenic group,

where R may be hydrogen or a hydrocarbon radical and are readily hydrolyzed by either acids or bases. Polymers and interpolymers containing the N-vinylamides have unexpectedly high melting points. For this reason they are of value as plastic materials, and can also be used as coating materials and for the preparation of fibers. Polymeric N-vinylsuccinimide is readily swelled by water to a plastic mass which when dry is tough and hard. It may be used as a chewing gum component, or as a water-sensitive putty.

Polymeric N-vinylsuccinimide is readily hydrolyzed by sodium hydroxide solution to poly-N-vinylsuccinamic acid, a polycarboxylic acid. Hydrolysis of polymeric N-vinylsuccinimide with hydrochloric acid gives a range of materials ranging from a gelatinous material, formed under mild hydrolytic conditions, to a compound obtained by heating the polymer at high temperatures with concentrated acid which, in the form of the free base, contains 75% of the nitrogen present as amino nitrogen and appears to be a polyvinyl amine. The hydrolytic product thus formed is soluble in water and dilute aqueous acids but is insoluble in organic solvents. Ethanolamine can be used to hydrolyze polymeric N-vinylsuccinimide to materials containing both free amino and free carboxyl groups. These materials or their salts are suitable for use as sizes or as dispersing agents. The polymeric compounds containing free amino groups are of value in modifying the dyeing characteristics of cellulose materials, particularly regenerated cellulose and cellulose acetate.

Monomeric N-vinylimides of aliphatic dicarboxylic acids are easily polymerized and form polymers under mild conditions.

Polymeric N-vinylsuccinimide has an extremely high softening point of 210° C. This polymer has the property of raising the softening point of other polymeric vinyl compounds with which it is interpolymerized even in rather small amounts. For this reason it is of particular value in combination with polymers of vinyl acetate, methyl acrylate and vinyl ethers, all of which alone, have very low softening points. Polymeric N-vinylsuccinimide is noticeably water-sensitive, and many of the interpolymers containing N-vinylsuccinimide have an enhanced degree of water-sensitivity due to its presence. This water-sensitivity is of particular value in preparing certain types of adhesives such as stamp adhesives.

The above description and examples are intended to be illustrative only. Any modification of or variation therefrom which conforms to the spirit of the invention is intended to be included within the scope of the claims.

We claim:

1. Process which comprises pyrolyzing an N-(β-acyloxyethyl) tertiary amide of an aliphatic carboxylic acid at 300–650° C.

2. Process which comprises pyrolyzing an N-(β-acyloxyethyl)-N-alkyl tertiary amide of an aliphatic carboxylic acid at 300–650° C.

3. Process which comprises pyrolyzing an N-(β-acyloxyethyl) tertiary imide of an aliphatic dicarboxylic acid at 300–650° C.

4. An N-vinyl tertiary amide of an aliphatic carboxylic acid.

5. An N-vinyl-N-hydrocarbon tertiary amide of an aliphatic carboxylic acid.

6. An N-vinyl-N-alkyl tertiary amide of an aliphatic carboxylic acid.

7. An N-vinyl tertiary imide of an aliphatic dicarboxylic acid.

8. N-vinylsuccinimide.

9. A polymer of an N-vinyl tertiary amide of an aliphatic carboxylic acid.

10. A polymer of an N-vinyl-N-hydrocarbon tertiary amide of an aliphatic carboxylic acid.

11. A polymer of an N-vinyl-N-alkyl tertiary amide of an aliphatic carboxylic acid.

12. A polymer of an N-vinyl tertiary imide of an aliphatic dicarboxylic acid.

13. An interpolymer of an N-vinyl tertiary amide of an aliphatic carboxylic acid with a different polymerizable compound having the formula

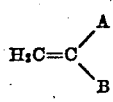

wherein A is selected from the class consisting of hydrogen, halogen and hydrocarbon radicals and B is selected from the class consisting of halogen and organic radicals containing a carbon atom joined to another atom by a plural bond, the carbon atom being removed from the H₂C=C= radical by not more than one atom.

14. An interpolymer of an N-vinyl-N-hydrocarbon tertiary amide of an aliphatic carboxylic acid with a different polymerizable compound having the formula

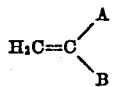

wherein A is selected from the class consisting of hydrogen, halogen and hydrocarbon radicals and B is selected from the class consisting of halogen and organic radicals containing a carbon atom joined to another atom by a plural bond, the carbon atom being removed from the H₂C=C= radical by not more than one atom.

15. An interpolymer of an N-vinyl-N-alkyl tertiary amide of an aliphatic carboxylic acid with a different polymerizable compound having the formula

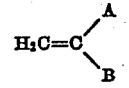

wherein A is selected from the class consisting of hydrogen, halogen and hydrocarbon radicals and B is selected from the class consisting of halogen and organic radicals containing a carbon atom joined to another atom by a plural bond, the carbon atom being removed from the H₂C=C= radical by not more than one atom.

16. An interpolymer of an N-vinyl tertiary imide of an aliphatic carboxylic acid with a different polymerizable compound having the formula

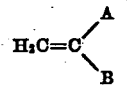

wherein A is selected from the class consisting of hydrogen, halogen and hydrocarbon radicals and B is selected from the class consisting of halogen and organic radicals containing a carbon atom joined to another atom by a plural bond, the carbon atom being removed from the H₂C=C= radical by not more than one atom.

WILLIAM EDWARD HANFORD.
HALSEY BIDWELL STEVENSON.

CERTIFICATE OF CORRECTION.

Patent No. 2,231,905.  February 18, 1941.

WILLIAM EDWARD HANFORD, ET AL.

It is hereby certified that error appears in the printed specification of the above numbered patent requiring correction as follows: Page 1, second column, line 52, for "decrystallization" read --recrystallization--; page 3, second column, line 21, for "S(CH$_2$—CO)$_2$NCH=$_2$" read --S(CH$_2$—CO)$_2$NCH=CH$_2$--; page 4, first column, line 23, for the syllable "metho-" read --metha--; and that the said Letters Patent should be read with this correction therein that the same may conform to the record of the case in the Patent Office.

Signed and sealed this 3rd day of June, A. D. 1941.

(Seal)

Henry Van Arsdale,
Acting Commissioner of Patents.